(12) United States Patent
Singhal et al.

(10) Patent No.: US 6,633,761 B1
(45) Date of Patent: Oct. 14, 2003

(54) ENABLING SEAMLESS USER MOBILITY IN A SHORT-RANGE WIRELESS NETWORKING ENVIRONMENT

(75) Inventors: Sandeep Kishan Singhal, Englewood Cliffs, NJ (US); Ajei Sarat Gopal, Riverdale, NY (US); Inder Sarat Gopal, New York, NY (US)

(73) Assignee: ReefEdge, Inc., Fort Lee, NJ (US)

( * ) Notice: Subject to any disclaimer, the term of this patent is extended or adjusted under 35 U.S.C. 154(b) by 518 days.

(21) Appl. No.: 09/637,742

(22) Filed: Aug. 11, 2000

(51) Int. Cl.[7] .............................. H04Q 7/20; H04Q 7/38
(52) U.S. Cl. ..................... 455/436; 455/437; 455/439; 455/440; 455/422.1; 455/432; 370/331; 370/332; 709/225; 709/203
(58) Field of Search ................................ 455/436, 437, 455/438, 439, 422, 432, 440, 443, 403, 550, 517, 426; 370/331, 332; 709/225, 203

(56) References Cited

U.S. PATENT DOCUMENTS

| | | | | |
|---|---|---|---|---|
| 6,249,252 | B1 | * | 6/2001 | Dupray ........................ 455/422 |
| 6,351,646 | B1 | * | 2/2002 | Jellema et al. .............. 455/432 |
| 2001/0044305 | A1 | * | 11/2001 | Reddy et al. ................ 455/436 |
| 2002/0035699 | A1 | * | 3/2002 | Crosbie ....................... 455/436 |
| 2002/0160806 | A1 | * | 10/2002 | Araazi et al. ............... 455/436 |

FOREIGN PATENT DOCUMENTS

| | | |
|---|---|---|
| EP | 0483551 A2 | 5/1992 |
| EP | 0589522 A1 | 3/1994 |
| EP | 0740440 A2 | 10/1996 |
| EP | 0851633 A2 | 7/1998 |
| WO | WO 00/69186 | 11/2000 |
| WO | WO 01/58177 A2 | 8/2001 |

OTHER PUBLICATIONS

Snoeren et al, "And End-to-End Approach to Host Mobility", 6th ACM/IEEE International Conference on Mobile Computing and Networking (MobiCom '00), Aug. 2000, Boston, MA.

* cited by examiner

Primary Examiner—William Trost
Assistant Examiner—Keith Ferguson
(74) Attorney, Agent, or Firm—Marcia L. Doubet

(57) ABSTRACT

The present invention provides methods, systems, and computer program instructions for enabling a variety of devices, particularly low-power hand-held devices, to travel seamlessly through a networking environment such as that encountered within a building by establishing connectivity to a plurality of network access points. The illusion of seamless network connectivity is provided by having these access points coordinate with a core server to perform user authentication, device address assignment, and handoff services.

36 Claims, 10 Drawing Sheets

FIG. 2

| | HMP address | IP address | Registration Time | Refresh Time | Expiration Time | Other Info |
|---|---|---|---|---|---|---|
| | 210 | 220 | 230 | 240 | 250 | 260 |
| 270 | 913214E0476 | 10.13.4.91 | 24-July-2000:15:32:01 | 11-August-2000:08:00:01 | 12-August-2000:08:00:01 | Acme Model 591 in Room 932 |
| 280 | 63098301C15 | 10.14.1.9 | 29-July-2000:06:11:58 | 11-August-2000:06:11:01 | 12-August-2000:06:11:01 | Bungee Model X41 in ConferenceRoomB |

| User name | Device IP address | Device MAC address | HMP MAC addresses |
|---|---|---|---|
| Bob | 192.168.3.14 | A3B43343121 | 5902C73624C |
| Sally | 192.168.5.12 | 393D1205109 | 95384E32091, 21049A89153 |

FIG. 8

| | 810 | 820 | 830 | 840 |
|---|---|---|---|---|
| 850 | Bob | PalmPilot:334131355 | ConferenceRoomB:93413A3 | 24-July-2000:09:33:21 |
| 860 | Sally | Laptop:334131892 | Room932:51524B3 | 24-July-2000:09:33:35 |
| 870 | Bob | PalmPilot:334131355 | ConferenceRoomB:93413B1 | 24-July-2000:09:33:38 |
| 880 | Bob | PalmPilot:334131355 | ConferenceRoomB:93413A3 | 24-July-2000:09:33:52 |

910: {Destination="Bob's Thermostat" 915
ALLOW {User="Bob" && Location="Bob's Office"} 925
ELSE DENY} 920

930: {Destination="Bob's Printer" 935
DENY {User="Rich"} 950
DENY {Location="Lobby"}
ELSE ALLOW} 940

ENABLING SEAMLESS USER MOBILITY IN A SHORT-RANGE WIRELESS NETWORKING ENVIRONMENT

FIELD OF THE INVENTION

The present invention relates to computer networks, and more particularly to methods, systems, and computer program instructions for enabling seamless connectivity and roaming with short-range wireless computing devices.

BACKGROUND OF THE INVENTION

In recent years, various short-range wireless network communications technologies, notably IEEE 802.11 and Bluetooth, have emerged to enable portable devices (such as laptops, cellular phones, personal digital assistants or PDAs, etc.) to communicate both with each other and with wide-area networking environments. (IEEE 802.11 is a standard of the Institute for Electrical and Electronics Engineers, which was approved in 1997 for wireless Local Area Network, or LAN, signaling and protocols. 802.11 addresses frequency hopping spread spectrum radio, direct sequence spread spectrum radio, and infrared light transmissions. Bluetooth is a specification for short-range wireless connectivity that is aimed at unifying telecommunications and computing. More information on these specifications can be found on the Internet at www.ieee.org and www.bluetooth.com, respectively.)

To enable this communication, various "bridging access points" are being developed. These bridging access points allow a device to wirelessly plug itself into the local LAN. All packets transmitted by the device are then simply forwarded onto the LAN, and the device can read all packets on the LAN (with the access point possibly providing some level of filtering based on, for example, the Media Access Control or MAC address of the device). Examples of commercially available bridging access points include products from Cisco and Lucent (for 802.11) and Widcomm and Axis (for Bluetooth).

Existing short-range wireless LAN solutions have a number of limitations, however. One significant limitation is that seamless roaming is impossible. That is, a device can maintain connectivity while traveling from one access point to another only if the access points are all on the same physical LAN. No existing solutions provide for a device to move seamlessly from one LAN to another without requiring considerable new infrastructure to be deployed (or without requiring significant changes to the device software itself). This is particularly problematic in the wireless environment because users are unlikely to be aware of the physical layout of the LAN topology, and thus they do not realize when they are physically moving outside the range of a particular LAN.

In the Bluetooth environment, roaming through bridging access points is especially troublesome. To maintain connectivity when moving from one access point to another, a device must retain its Internet Protocol (IP) address. A Bluetooth client device, however, obtains IP connectivity by establishing a new Point-to-Point Protocol (PPP) connection with each access point, and the Bluetooth client may therefore request a new IP address (using the Dynamic Host Configuration Protocol, or DHCP). Using bridging access points, obtaining a new IP address for a particular client device each time it moves to a different access point therefore interrupts the device's connectivity and thus makes roaming non-transparent. (PPP is documented in Request For Comments (RFC) 1661, dated July 1994. DHCP is documented in RFC 2131, dated March 1997. Both are available on the Internet at www.ietf.org.)

One solution to the seamless roaming problem involves the use of Mobile IP. In this scheme, the IP address of a mobile device does not change as it moves from one network to another. A device has an associated fixed "home agent" on its home network. When the device moves, it registers with a "foreign agent" on a different network. Messages sent by and destined for the device are tunneled (i.e. forwarded) through the foreign agent. Because the IP address remains static in this configuration, roaming can be achieved. However, this solution has a number of drawbacks. First, it is defined for use only with IP version 4 ("IPv4") and does not work with IP version 6 ("IPv6"), which is also referred to as "IP Next Generation" and is intended to replace IPv4. Furthermore, a Mobile IP solution requires the LAN administrator to place a foreign agent on each LAN, to assign every user a well-known home agent, and to assign every device a fixed (permanent) IP address. This last requirement is particularly onerous because routable IP addresses are a limited resource on today's Internet; moreover, for security reasons, most systems administrators assign private addresses to internal hosts and hide those addresses from the larger Internet through the use of a firewall that performs Network Address Translation (NAT). Mobile IP also requires considerable effort in order to install and configure a working system.

Another solution to the roaming problem has been proposed by Alex Snoeren and Hari Balakrishnan in their paper, "An End-to-End Approach to Host Mobility," Proceedings of MobiCom 2000, August 2000. Recognizing the limitations of Mobile IP, these authors suggest that seamless mobility can be achieved by adding additional mechanisms to the Transmission Control Protocol (TCP), allowing an established connection to be "re-mapped" to a client's new IP address. In this way, as the client roams, it is free to obtain a new IP address and consequently re-map all of its open connections. This approach has a number of limitations, however. It requires changes to the TCP implementations on all clients and servers, which is an unlikely occurrence. Applications that are aware of the device's IP address must be modified to learn about and handle the IP address changes that occur as the device roams. The solution does not work for User Datagram Protocol (UDP)/IP-based communication. Finally, the system relies on Dynamic Domain Name Service (DDNS) to allow remote hosts to learn about the client's current IP address; unfortunately, DDNS is not yet fully deployed.

Accordingly, what is needed is a short-range wireless solution that enables seamless network connectivity yet does not suffer from the limitations of prior art techniques.

SUMMARY OF THE INVENTION

The present invention is directed to methods, systems, and computer program instructions for enabling seamless connectivity and roaming with short-range wireless computing devices. The disclosed techniques enable a variety of devices, particularly low-power hand-held devices, to travel seamlessly through a networking environment (such as that encountered within a building) by establishing connectivity to a plurality of network access points. These network access points are referred to herein as Handoff Management Points (HMPs). The illusion of seamless network connectivity is provided by having these access points coordinate with a core server to perform user authentication, device address assignment, and handoff services.

BRIEF DESCRIPTION OF THE DRAWINGS

FIG. 2 depicts an example of an HMP Registry that may be used by the preferred embodiment of the present invention;

FIG. 3 depicts an example of an Active User Location (AUL) Registry that may be used by the preferred embodiment of the present invention;

FIG. 8 depicts an example history log that may be used by the preferred embodiment of the present invention; and FIG. 9 depicts an example policy file that may be used by the preferred embodiment of the present invention.

DETAILED DESCRIPTION OF THE PREFERRED EMBODIMENT OF THE INVENTION

The present invention will now be described more fully hereinafter with reference to the accompanying drawings, in which the preferred embodiment of the invention is shown. Like numbers refer to like elements throughout.

The present invention is described below with reference to flowchart illustrations of methods, apparatus (systems), and computer program instructions embodied on one or more computer readable media according to an embodiment of the invention. As will be obvious to one of ordinary skill in the art, these flowcharts are merely illustrative of the manner in which the preferred embodiment of the present invention may be implemented, and changes may be made to the logic that is illustrated therein (for example, by altering the order of operations shown in some cases, by combining operations, etc.) without deviating from the inventive concepts disclosed herein.

Figure 1:
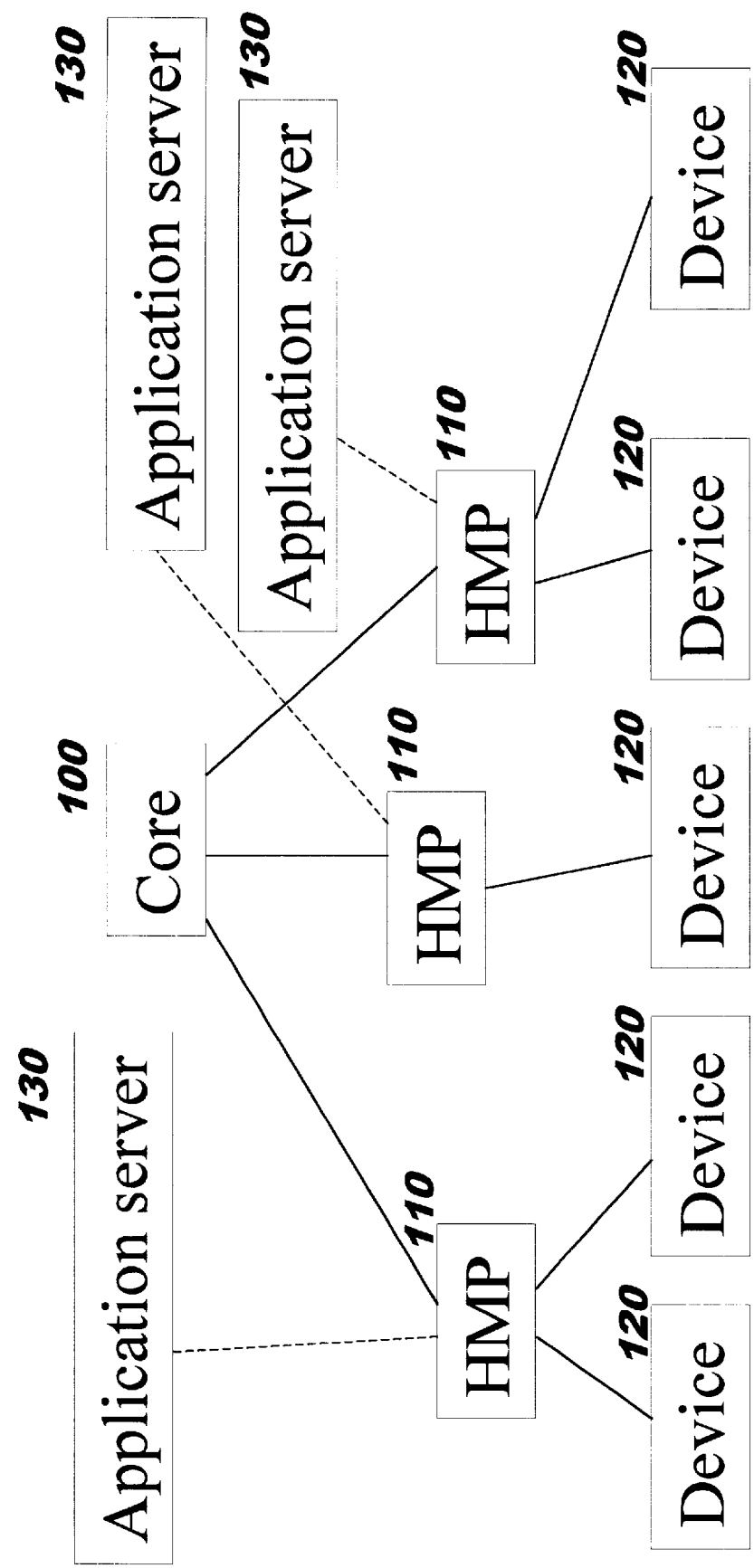
FIG. 1 illustrates the components involved in the preferred embodiment of the present invention.

Referring now to FIG. 1, the four major components involved in an implementation of the present invention are depicted These components are: (1) client devices 120; (2) Handoff Management Points 110; (3) Handoff Core Server(s) 100; and (4) application servers 130. Each of these components will now be described, as it pertains to the present invention.

Devices 120 used with the present invention (such as laptop computers, handheld computers, PDAs, cellular phones, etc.) are each equipped with a short-range wireless communications capability. The particular communications capability in use does not form part of the present invention, and may include technologies such as 802.11, Bluetooth, or similar technologies (which may be as yet undeveloped). The wireless attachment may be built into the device. Or, it may be made available in another manner, including but not limited to: via a plug-in card (such as a PCMCIA, or Personal Computer Memory Card International Association, card), or by attaching a dongle (that is, a plug-in device that attaches to a USB, or Universal Serial Bus, port or to an RS232 port).

HMPs 110 have two network interfaces. One is a short-range wireless link (used to communicate with the devices 120), and the other is a link to a network environment (such as an intranet or the Internet) in which a target application to be accessed by a roaming device 120 resides. In the preferred embodiment, this second interface is an Ethernet interface, although it could alternatively use another protocol such as Token Ring (IEEE 802.5), 802.11, or other protocols. Devices use the HMP as their channel for sending and receiving network packets to and from the network environment.

A central Handoff Core Server 100 (referred to hereinafter as a "Core") resides in the network infrastructure and provides services to HMPs 110 as users of devices 120 roam through the environment.

One or more application servers 130 host the application(s) that are being accessed by devices 120 as they roam over the short-range wireless network.

The Core preferably maintains two data repositories that it uses to enable the seamless roaming of a device 120 from one HMP 110 to another. These repositories are referred to herein as the HMP Registry and the AUL Registry.

The HMP Registry maintains a record of the currently known HMPs that are participating in the roaming domain supported by the Core. In the preferred embodiment, the HMP Registry tracks the time when a particular HMP first registered with the Core, when it most recently refreshed its registration, and when its current registration will expire. (HMP registration will be described in more detail below.) Additional fields in this registry preferably comprise: the MAC address of the HMP, the IP address of the HMP, optional identifying information about the HMP (such as its administrator-assigned name, manufacturer, model number, etc.), and (optionally) its current physical location.

An example HMP Registry 200 is depicted in FIG. 2. An HMP's MAC address (column 210) is preferably used as a key to access entries in the HMP Registry. The example IP addresses shown in column 220 are IPv4 addresses, although this is for purposes of illustration and not of limitation: Other address forms, in particular IPv6, may be specified alternatively. Initial registration times for the example HMPs 270 and 280 are shown in column 230. Column 240 then shows that each HMP has a more recent, refreshed registration time, which will expire at the time indicated in column 250. Finally, column 260 provides miscellaneous information about each HMP, such as what type of device it is and where it is physically located.

The AUL Registry maintains a record of the currently active users who are using HMP(s) in the Core server's domain. Fields in this registry preferably comprise: a name or other identifier for each active user (referred to hereinafter as the user name, for ease of reference); the IP address of the device being used by that user; the MAC address of the device; and the MAC address(es) of one or more HMPs through which the device is currently communicating.

An example AUL Registry 300 is depicted in FIG. 3. The device MAC address (column 330) is preferably used as a key to access entries in the AUL Registry. Alternatively, some combination of user name 310, device IP address 320, and/or device MAC address 330 may be used as a key, according to the needs of a particular implementation of the present invention. As discussed above with reference to FIG. 2, the example IP addresses shown in column 320 are shown as IPv4 addresses for illustrative purposes. As shown in column 340, the device in use by a particular user may be currently associated with a single HMP (as in the case of user 350), or with multiple HMPs (as shown for user 360).

The manner in which HMPs make themselves known to the Core, and in which this information is used by the Core to enable devices to seamlessly roam from one HMP to another, will now be described with reference to the logic depicted in the flowcharts of FIGS. 4 through 7.

Figure 4:
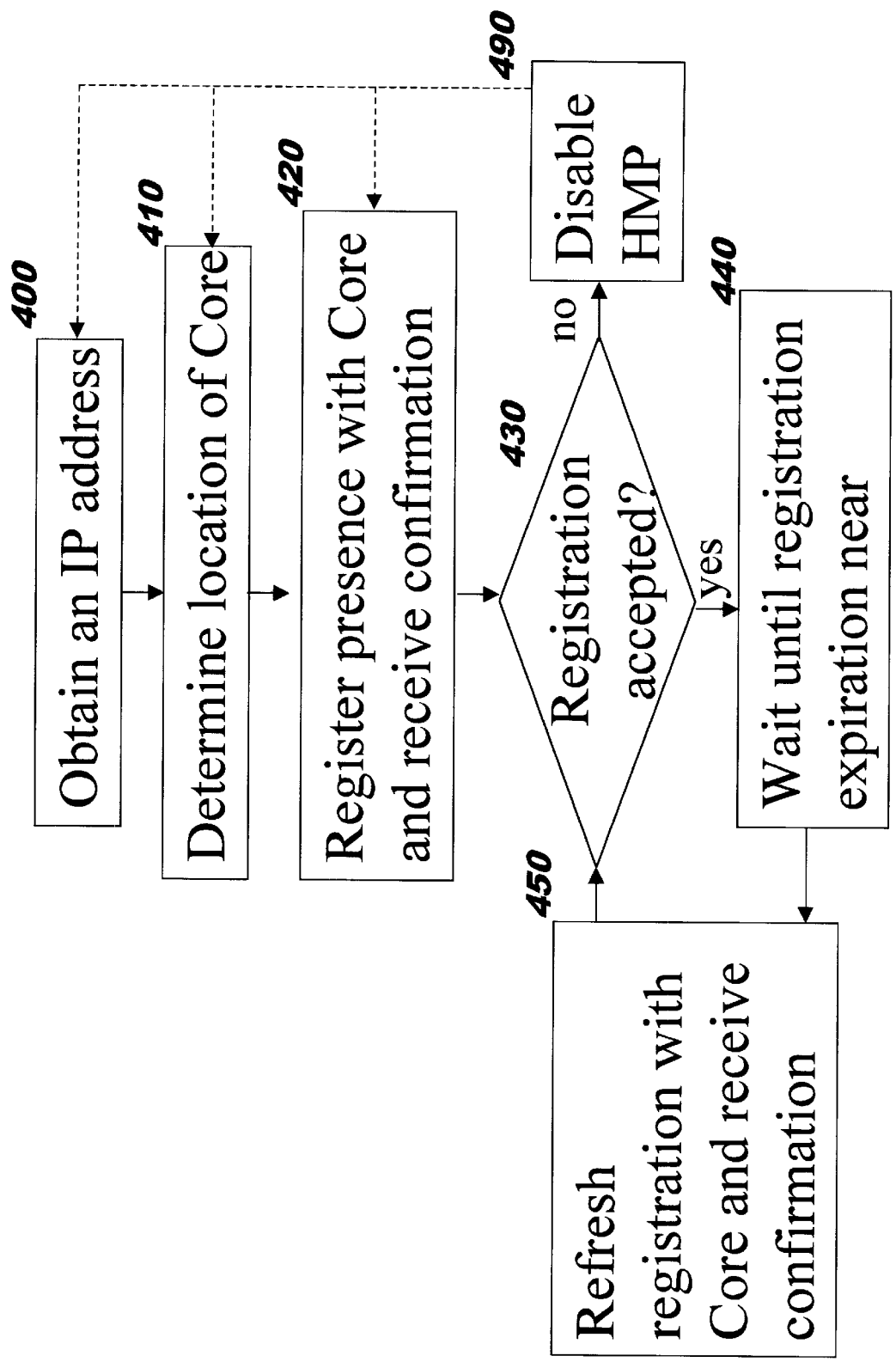
FIG. 4 provides a flowchart that depicts the logic with which a Handoff Management Point (HMP) boots and connects to the network, according to the preferred embodiment of the present invention.

An HMP boots, then becomes known to the network, and then communicates over the network to maintain connectivity with the Core. This connectivity is required to ensure that the HMP can coordinate with the Core about handoff for its user devices, and to ensure that the Core is aware of whether each HMP is functioning or whether it has failed, been unplugged, or otherwise become unavailable. FIG. 4 illustrates the preferred embodiment of the logic with which this process occurs.

When the HMP boots, it obtains an IP address (Block 400). In the preferred embodiment, this IP address is obtained using DHCP, although other address determination schemes (such as the BOOTP or RARP protocol) may be used alternatively without deviating from the inventive concepts disclosed herein.

The HMP must also determine the location of the Core, as shown at Block 410. This discovery of the Core's location may use any one of a standard set of discovery protocols, such as the Service Location Protocol (SLP), DHCP, or the Domain Name Service (DNS). In the preferred embodiment, DHCP is used. As is known in the art, a DHCP server can be configured to provide clients not only with an IP address, but also with other configuration information (such as addresses of DNS servers, the address of the local router, etc). This feature may be used advantageously with the present invention, by having a systems administrator configure the DHCP server to provide a booting HMP with the address of the Core server in addition to the HMP's IP address. Thus, if a Core server address was provided by the DHCP server along with the HMP's IP address, then this Core server address will be used as the result of Block 410. Otherwise, the HMP issues an explicit request for this information (using, e.g., an SLP query).

Each HMP must keep the Core server apprised of its presence, where this presence is recorded by the Core in its HMP Registry (as discussed above). An "HMP presence protocol" is therefore used to register each booting HMP with the Core. This protocol begins with the HMP issuing a registration request (Block 420) to the Core server. The registration request identifies the MAC address and IP address of the HMP, and optionally other identifying information. (See columns 210, 220, and 260 of the example HMP Registry in FIG. 2.)

Optionally, the HMP may request a particular registration validity period (as will be described in more detail with reference to Block 430). When this option is used, the validity period value requested by the HMP is preferably specified as an optional field in the registration request message. A number of optional fields may be present in this message, according to the needs of a particular implementation, where each such field preferably has a well-known numerical identifier that is used to indicate its presence. An (Option Identifier, Option Value) pair is then specified in the registration request message, where in this case the Option Identifier indicates that this is information to be used as the registration validity period. Preferably, the value is specified as an offset, which will then be used by the Core to compute an actual expiration time (such as that shown in column 250 of FIG. 2).

After issuing the registration request, the HMP then awaits a response from the Core. As shown at decision Block 430, once this response is received the HMP determines whether the response indicates a successful registration. If the answer is negative, then at Block 490 the HMP preferably disables itself. (It may, however, restart registration processing at any time by restarting its logic at Block 400, 410, or 420.)

Figure 5:
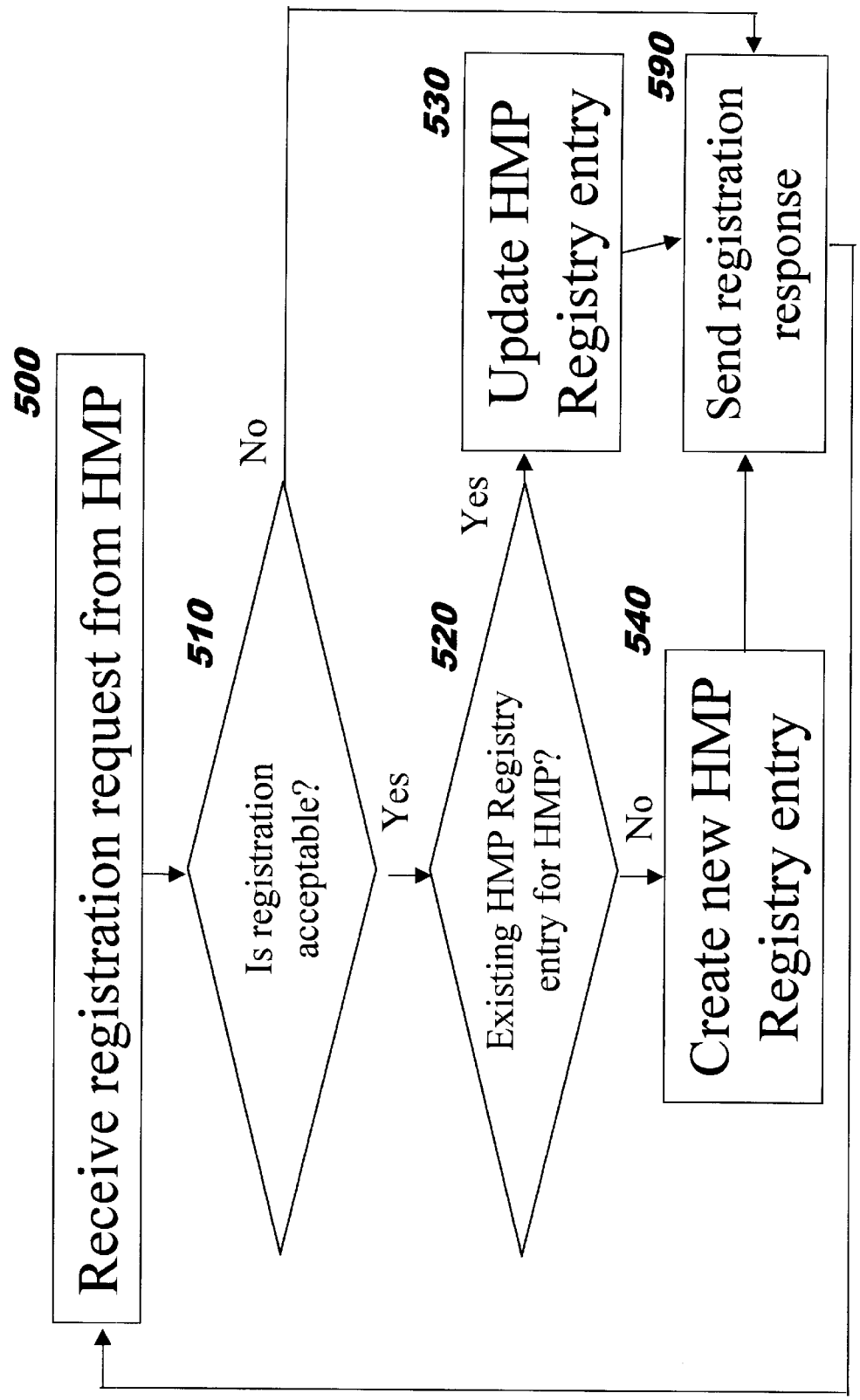
FIG. 5 provides a flowchart that depicts the logic with which a Handoff Core server processes an HMP presence protocol, according to the preferred embodiment of the present invention.

If the answer to decision Block 430 is positive, then this is a successful registration (i.e. the registration is accepted by the Core, as will be discussed in more detail below with reference to FIG. 5), and control continues to Block 440. In the preferred embodiment, the response from the Core server indicates for how long this HMP's registration is valid. (Preferably, this value is sent by the Core as an offset, and the HMP will use the offset to compute its actual expiration time. This technique accounts for clock differences between the Core and the HMP. Alternatively, a specific date and time may be sent by the Core as the expiration time.) The registration validity period may optionally be known in advance to either or both the Core and the HMP. The manner in which the length of the validity period is determined may be implementation-specific, and does not form part of the present invention. Alternatives include: specifying a fixed value in a configuration file (or configuration registry, database, etc.); specifying a fixed value with an administrative tool; hard-coding a value into an implementation of the Core (and/or in the HMP, when the HMP will provide a validity time period request parameter in the registration request); dynamically determining the validity period based on environmental or other factors (such as the current load on the Core, given that the registration process, and re-registration of already-registered HMPs in particular, will impose a processing load on the Core); etc.

In the preferred embodiment, the registration validity period for each HMP is the same length. Alternatively, an implementation of the present invention may use validity periods that vary from one HMP to another. For example, if a particular HMP is known to fail more frequently than some average value, or if an HMP is known to be moved relatively often, then it may be desirable to assign such an HMP a registration validity period that accounts for those factors. As another example, a newly-seen HMP may be assigned a short expiration, whereas one that has been known to the Core for a relatively long period may be assigned a longer expiration (perhaps in recognition that a new HMP is more likely to be moved, but a long-standing HMP is less likely to be moved).

The Core server of the preferred embodiment preferably supports a mixed model of operation with regard to registration validity periods, where validity period values are accepted from those HMPs which supply this information and validity period values are provided by the Core for those HMPs which do not. (As will be obvious, the Core may modify the value of a validity period supplied by an HMP, using static or dynamic factors such as the Core processing load discussed above.) Alternatively, a Core server for a particular implementation may be written to always generate the validity period (in effect ignoring any HMP-supplied values), or to always expect a value from the HMP (where a default value is preferably used for those HMPs that do not supply this information).

When the registration response received from the Core is positive and control therefore reaches Block 440, with regard to the HMP presence protocol the HMP then waits until its registration validity expiration time approaches and then performs a request to refresh its registration (Block 450). By using this registration expiration and refreshing technique, the HMP periodically notifies the Core that it is still "alive" and functioning, and the response from the Core provides a periodic notification to the HMP that its registration and participation in the Core's domain is still valid (assuming the response to the refresh request is positive). After sending the refresh request (which may optionally specify a validity period, as has been described above), control transfers to Block 430 to await the Core's response (and to begin the processing thereof).

Through use of the HMP presence protocol that has been described, an HMP can boot, configure, and integrate with the Core server with no administrator intervention. Seamless connectivity and roaming is therefore simple and cost-effective to provide and support, thus relieving the huge administrative burden of existing manually-configured prior art wireless network solutions.

The processing which takes place at the Core server to perform the HMP presence protocol will now be described with reference to FIG. 5. The process begins at Block 500, where the Core receives a registration request (or a registration refresh request) from an HMP. At decision Block 510, the Core determines whether to accept this registration. A registration request may be rejected for various reasons, according to the needs of a particular implementation. For example, Core-related conditions may be evaluated, such as whether the Core is currently operating at its maximum load or maximum efficiency or maximum license capacity, and if so, any new registrations may therefore be rejected. (It may also be desirable to reject registration refresh requests under certain Core-related conditions such as these.) Or, the Core may have detected that a particular HMP is invalid, failing frequently (and thereby causing network disruption), or otherwise functioning poorly, in which case the HMP's registration (or registration refresh) request may be rejected. (The registration messages for newly-arriving HMPs and the registration refresh messages for already-known HMPs that are to be processed by the Core according to the logic of FIG. 5 will be referred to hereinafter simply as registration request messages, for ease of reference.)

In the preferred embodiment, the Core's capacity is based on factors which include: (1) the number of licenses purchased (which may include licenses for a fixed number of HMPs, a fixed number of supported users, and/or a fixed number of user devices); (2) the current traffic or CPU load; and/or (3) storage constraints on the Core's resources (including whether the HMP Registry and AUL Registry previously described are able to handle more registration information). Optionally, a capability may be provided for other capacity information to be set by a systems administrator, for example to limit registrations for security purposes.

If the answer to decision Block 510 is negative (that is, the registration is being rejected), then control passes to Block 590 where a negative response is sent to the requesting HMP. (The server may optionally delete any existing HMP Registry entries for this rejected HMP, in the case that the request is a registration refresh.) Control then returns to Block 500 to await another incoming registration request.

If the answer to decision Block 510 is positive, then at Block 520 the Core determines whether the requesting HMP already has an existing registration in the HMP Registry. As stated above with reference to FIG. 2, the HMP's MAC address (which is received in the registration request message) is preferably used as a key to index into the HMP Registry.

If an entry in the HMP Registry for this HMP is located, then decision Block 520 has a positive result and control transfers to Block 530. At Block 530, the HMP's entry in the Registry is updated with a new registration expiration time (which may be determined by the Core, from information supplied by the HMP, or a combination thereof, as has been described above). A response message is then returned to the HMP at Block 590, and control returns to Block 500.

If no entry is found in the HMP Registry for this HMP, then decision Block 520 has a negative result and a new entry is created at Block 540. In addition to the current date and time, and the validity period information which is determined as has been described, this new entry uses information about the HMP which, in the preferred embodiment, is received in the registration request message. (Alternatively, information from other sources may be used. For example, information about where a particular HMP is physically located may be obtained by consulting a previously-stored entry in a directory or look-up table, or it may be supplied through an external data entry application executed by a systems administrator.)

After creating the new HMP Registry entry, a response is returned (Block 590) to the requesting HMP, and control transfers back to Block 500 to await arrival of the next registration request message.

It should be noted that throughout this process, an HMP Registry entry for an HMP whose registration expiration time has elapsed without a successful refresh is treated as if it did not previously exist. Periodically, the Core may purge stale entries from its HMP Registry to account for this situation. Moreover, an HMP may explicitly notify the Core to terminate its registration, in which case the Core deletes the HMP's entry from the HMP Registry. (This termination logic has not been shown in FIG. 4 or 5, but one of ordinary skill in the art will readily understand how such logic can be added.) In the preferred embodiment, when an HMP Registry entry expires or is deleted, the corresponding entries in the AUL Registry that reference this HMP (see column 340 of FIG. 3) are also deleted.

In this manner, the Core learns about and keeps track of HMPs that are present in its domain. Furthermore, the Core can also detect HMP failure or disconnection, and will therefore purge HMP Registry entries (and AUL Registry information) for HMPs that do not refresh their registrations.

Figure 6:
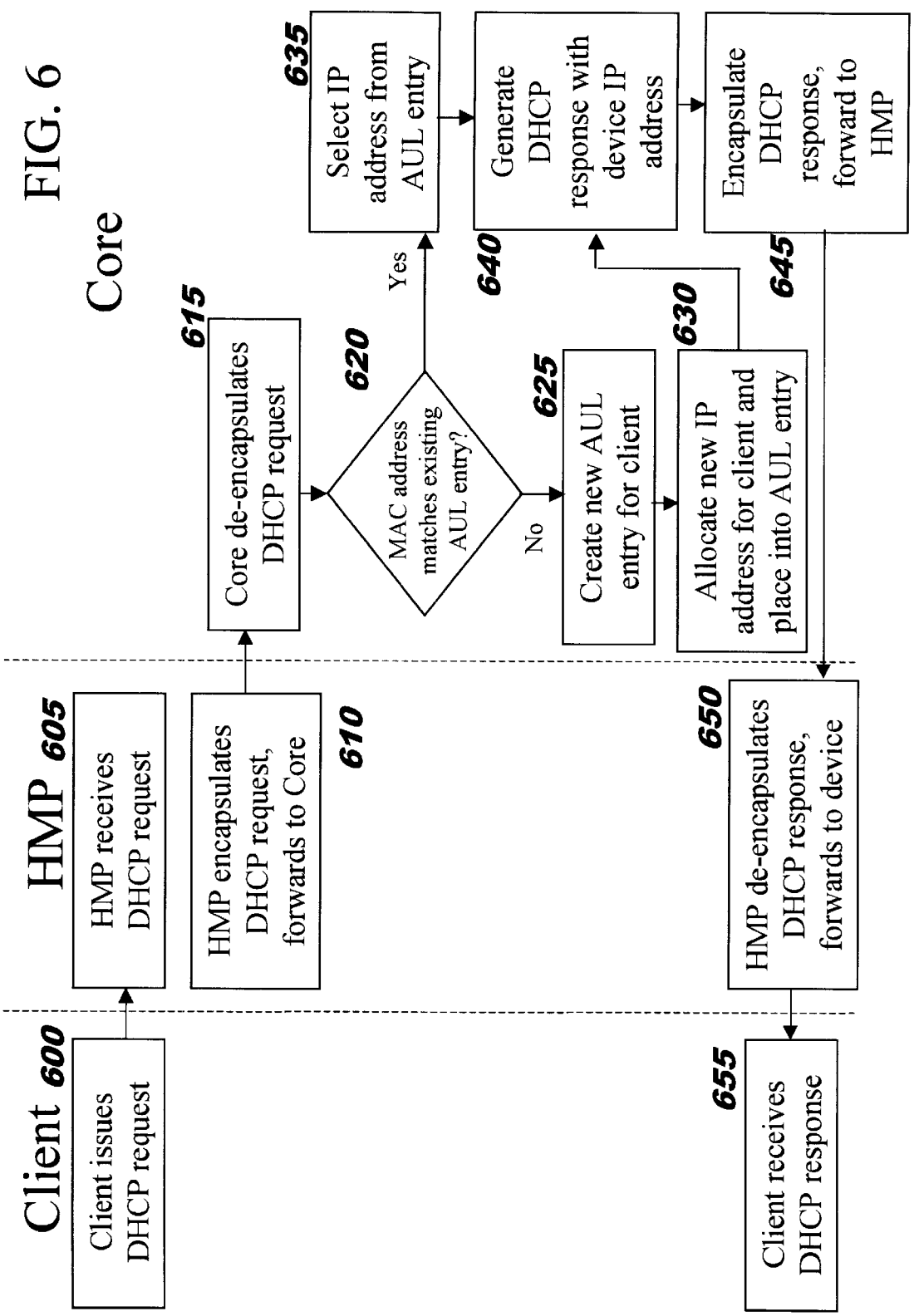
FIG. 6 provides a flowchart that depicts the logic with which a client becomes known to an HMP while seamlessly roaming through the network, according to the preferred embodiment of the present invention.

The manner in which a client device communicates through HMPs in its proximity, and thereby achieves seamless roaming, will now be described with reference to FIG. 6. By establishing communications with an accessible HMP (i.e. an HMP that is within the device's communication range), a session or channel is established over which IP traffic may subsequently flow. This IP traffic will then be routed to its destination by the HMP and/or Core. In the Bluetooth environment, for example, this channel is preferably a PPP link established over the Bluetooth RFCOMM layer. In an 802.11 environment, this channel is preferably established implicitly when IP traffic first flows to the HMP. In the preferred embodiment, an authentication process is performed to authenticate the users of connecting devices before allowing a communication channel to be successfully established. The Core server preferably implements a RADIUS interface for this purpose. (RADIUS, or Remote Authentication Dial In User Service, is documented in RFC 2865, dated June 2000.) The user's name and password is provided to the remote endpoint (which in the present invention is the HMP). PPP, for example, provides for conveying this information to the HMP as part of a PPP link establishment. Having received the user name and password, the HMP then uses RADIUS to communicate this information to an authentication server (which in the present invention is the Core server).

Having established a communication channel (when using a link-level protocol such as PPP, as illustrated herein with reference to Bluetooth, the client device then issues a DHCP address assignment request (Block 600 of FIG. 6) to obtain an IP address. (When using an implicit channel establishment approach in response to detecting IP traffic, as discussed above and illusrated herein with reference to 802.11. this IP traffic itself may be the DHCP request.

In the preferred embodiment, the client device uses the same IP address as it roams throughout the wireless network environment. This enables the device to retain on-going connectivity with any application(s) that it may be executing. Consequently, the device's IP address is assigned by the Core server, and the Core ensures that all DHCP requests from a particular device are responded to with the same (constant) IP address throughout the lifetime of this device's on-going session within the Core's domain. (Note that a device's session may be temporarily interrupted for short periods of time, for example while the device is being moved through an area not serviced by an HMP. In the preferred embodiment, the Core monitors temporary interruptions of this type using an expiration timer value and thereby enables the device to maintain its IP address until it establishes communications with another HMP, as will be described in more detail below with reference to maintaining entries in the AUL Registry. The optimal length of time to be used as the expiration timer will be implementation-specific.)

The DHCP request issued by the client device at Block 600 is received by the HMP through which it is currently communicating (Block 605). The HMP then encapsulates this DHCP request into a request message, and forwards this encapsulated message to the Core server (Block 610). The forwarded request is sent to a designated port on the Core, using a pre-determined well-known port number. (This designated port number may be specifically chosen for use with the present invention. Alternatively, an already-assigned port number such as the DHCP port number may be re-used for this purpose, provided that information in the forwarded message can be used to determine that this is a DHCP request being forwarded from an HMP.)

At Block 615, the Core receives and de-encapsulates the DHCP request. The Core then inspects the MAC address of the client device from this request, and determines (at decision Block 620) whether an entry already exists in the Core's AUL Registry for this MAC address. If so, then control transfers to Block 635 where the existing IP address from the AUL Registry entry is selected for assignment to the requesting device. On the other hand, when no existing entry is found in the AUL Registry, control transfers to Block 625 where the Core creates a new AUL Registry entry. Preferably, information from the forwarded DHCP request is used when creating the AUL Registry values as shown in columns 310, 330, and 340 of FIG. 3. The Core then assigns a new IP address to the requesting device (Block 630) and stores that address in the newly-created AUL Registry entry for the device (as shown in column 320 of FIG. 3).

After the processing of Block 630 or Block 635, the Core generates its DHCP response, using either the newly-created or retrieved IP address, respectively, at Block 640. At Block 645, the Core then encapsulates this response and forwards it to the HMP that forwarded the DHCP request. The HMP receives the response; de-encapsulates it, and forwards it on to the requesting client device (Block 650). Upon receiving the response (Block 655), the client then knows the IP address that it should use for further communications.

In this way, the client can perform a standard DHCP request, and that request will always be handled by the Core, a regardless of whether other DHCP servers are present on the LAN. Moreover, each DHCP request by a particular device will always result in assignment of the same IP address, regardless of which HMP receives the request. (In the preferred embodiment, if more than one HMP receives a particular client's DHCP request resulting from the processing of Block 600, each HMP will forward the request to the Core. Because each request identifies the same client MAC address, the Core will assign the same IP address to the requesting device in accordance with the algorithm of FIG. 6, and return this IP address in its response to each HMP. Each HMP will then forward the response to the device, which will receive duplicate responses containing the identical IP address assignment.)

Figure 7A:
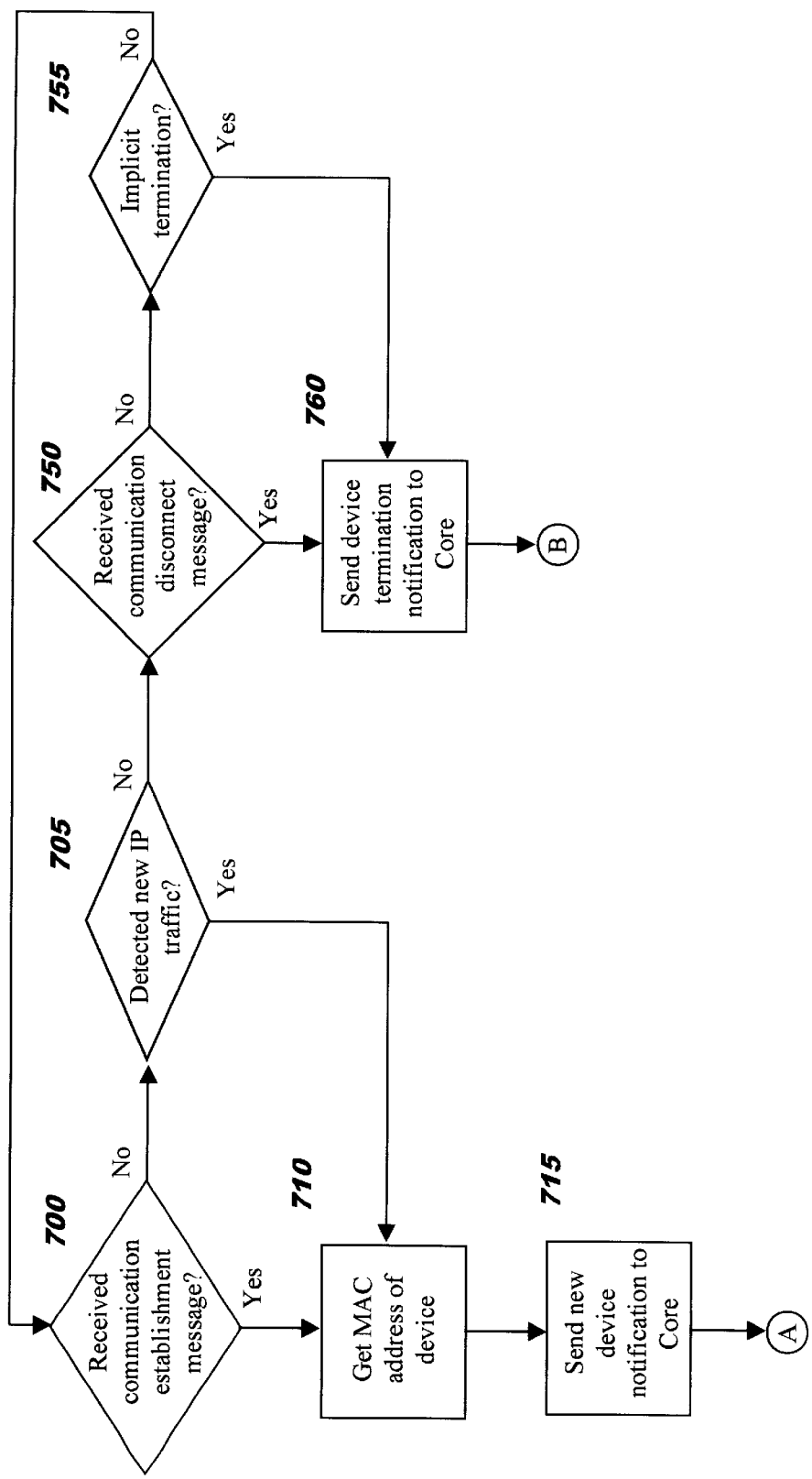
FIG. 7 provides a flowchart that depicts the logic with which an HMP handoff protocol may be performed, according to the preferred embodiment of the present invention.
Figure 7B:
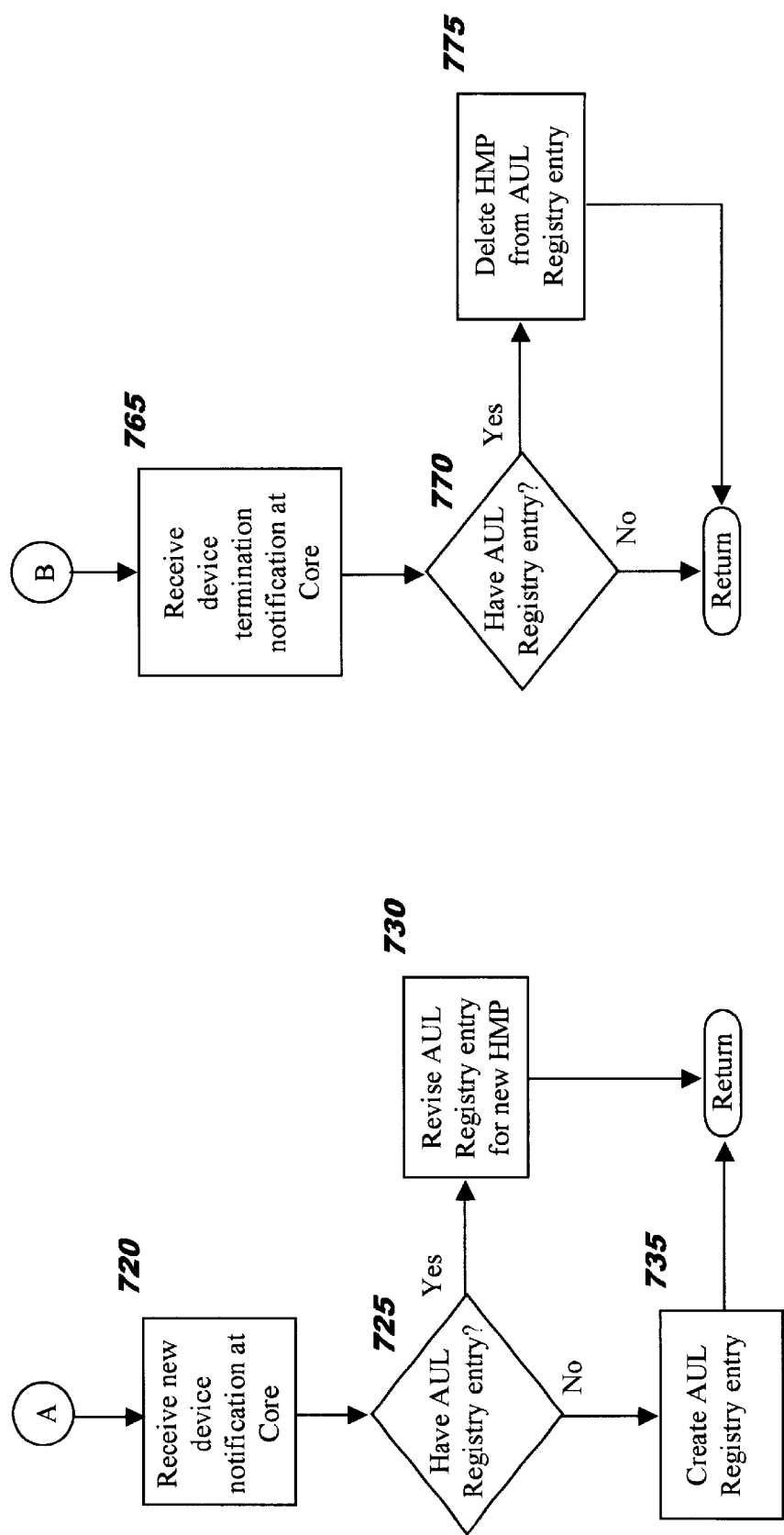

The process with which handoff of a client device occurs, as the device roams throughout the wireless network, will now be described with reference to the flowchart in FIG. 7.

The Core server, through the AUL Registry, tracks which HMP each device is currently using to communicate. Keeping this information up-to-date is facilitated by a handoff protocol implemented by the HMPs. The nature of the handoff protocol depends on how the communication channel is established between the device and the HMP. Two alternatives, referred to herein as the "explicit environment" and the "implicit environment", will now be described.

The explicit environment is used when a device explicitly requests connection to an HMP, for example by establishing a PPP link. When the communication channel establishment message is received, the decision in Block 700 has a positive result, and processing continues at Block 710; otherwise, processing continues at Block 705. In this explicit environment, the HMP retrieves the device's MAC address from the received message (Block 710), and then issues a notification to the Core (Block 715) that includes the device's MAC address as well as the HMP's MAC address (Note that when a PPP connection is established, the client provides a user name, allowing the HMP to also notify the Core about which user is currently using the channel when sending the notification message in Block 710.)

The implicit environment is used when a device implicitly connects to an HMP, for example when the HMP detects new IP traffic generated by a heretofore-unseen device. When the implicit connection is established, Block 705 has a positive result, and processing continues at Block 710; otherwise, FIG. 7 indicates that the HMP handoff protocol may also check for client disconnects, as described below with reference to Blocks 750 and 755. In this implicit environment, the HMP retrieves the device's MAC address from the received traffic (Block 710), and sends a notification to the Core as described above (Block 715).

When the Core receives notification of a new communication channel from an HMP (Block 720), it checks the AUL Registry (Block 725) to determine whether an entry exists for this device using the device's MAC address which was provided by the HMP in the notification message. If an entry is found (i.e. the decision in Block 725 has a positive result), then at Block 730 the MAC address of the notifying HMP is added to the list of HMPs currently being used by this device. (See column 340 of FIG. 3 for an example.) On the other hand, if no entry is found, then a new device entry is created at Block 735 which (as previously stated) preferably uses the device's MAC address as its key. This new device entry preferably has a blank IP address (see column 320), as the client has not yet sent a DHCP address assignment request, and records the notifying HMP's MAC address (see column 330). If the user name has been provided in the notification message, then this information is also recorded in the new device entry (see column 310).

Client disconnects are also addressed by the HMP handoff protocol of the preferred embodiment. When the handoff event being evaluated by an HMP is neither an explicit nor an implicit communication establishment, then control reaches decision Block 750 which checks to see if an explicit disconnect has occurred. In the preferred embodiment, this explicit disconnect is a result of receiving an explicit termination message from a client device. If such a message is received, the test in Block 750 has a positive result and processing continues at Block 760.

When the test in decision Block 750 has a negative result, Block 755 checks to see if an implicit termination has occurred. If this test has a positive result, processing continues at Block 760. An implicit termination may arise when an HMP determines (using implementation-specific conditions) that the communications channel with a device should be terminated. Implicit termination may also arise if no traffic is heard from a device during a time out period, after which the HMP may safely conclude that the device has failed, been turned off, or otherwise ended communications. The time out period may be protocol-specific, depending on the protocol used in the explicit environment; alternatively, this timeout period may be determined according to the needs of a particular system in which an HMP is implemented.

When the tests in all of Blocks 700, 705, 750, and 755 have a negative result, control returns to Block 700 to await the next handoff event.

Block 760 is reached when either an explicit or implicit termination for a particular device has occurred. The HMP therefore sends a termination notification to the Core, where this message includes the device's MAC address and the HMP's MAC address. When the Core receives this notification from the HMP (Block 765), the Core inspects its AUL Registry (Block 770) for an entry for that device's MAC address. If this record is found (i.e. the test in decision Block 770 has a positive result), then the notifying HMP is removed (Block 775) from the list of HMPs that the device is currently communicating with. (If no entry is found for this particular device, then the test in decision Block 770 has a negative result. This is an error condition which may be handled as deemed appropriate by a Core server implementation, including: ignoring this situation; logging an error message to a file; displaying an error message on a system administrator's user interface display; etc.) Following a negative result at Block 770 or the processing of Block 775, control returns to Block 700 to await the next HMP handoff protocol event.

Using this technique for communicating handoff information from HMPs to the Core, the Core maintains a current view of which HMPs are being used by each device in the domain at any point in time. As devices roam about the network, each device's current HMP identifications are updated in the AUL Registry.

Moreover, a historical record of which users were using which devices and/or which HMPs at any particular time may be created by recording information in a log file as updates are made to the user location information in the AUL. FIG. 8 shows an example of such a log file, which in this case records the user's name or other identifier (column 810); the device type and serial number of the user's device, if known (column 820); the physical location and/or the serial number (if known) of the HMP which was used (column 830); and the starting time when this HMP was used (column 840). Instead of, or in addition to, using the device's serial number, its MAC address may used. Similarly, the HMP's MAC address may be used instead of or in addition to its serial number. In the example of FIG. 8, only the starting time of using an HMP has been recorded. The ending time can be programmatically deduced, for example by detecting that multiple log entries exist for user "Bob" with the same Palm Pilot device: it can be seen by inspection of the example log file that Bob was originally using the HMP having serial number 93414A3 (row 850), then changed to use the HMP having serial number 93413B1 17 seconds later (row 870), and then changed back to using the HMP with serial number 93414A3 14 seconds after that (row 880). Thus, Bob was roaming about while using his Palm Pilot in an area that had at least two HMPs in relatively close proximity to each other. Alternatively, a log file could contain an explicit ending time for use of each HMP, where the Core would create this ending time upon receiving notification that the device had terminated its communication channel or moved from one HMP to another.

In addition to the AUL Registry additions and deletions that were described with reference to FIG. 7, the Core server may also perform maintenance on this Registry that is not instigated by notification messages from an HMP. As previously stated, when an HMP's registration expires or when an HMP is otherwise terminated and thus fails to re-register, the Core server of the preferred embodiment deletes the HMP's MAC address out of all entries in the AUL Registry. In addition, the Core preferably uses an expiration timer to remove entries from the AUL Registry when an entry has had no active HMP(s) associated with it for a period of time, indicating that the user has not had an active communications channel with an HMP for a sufficiently long time. The expiration timer is preferably of sufficient duration to allow devices that temporarily move through an area not serviced by an HMP to remain connected until entering the service area of another HMP, without having their entries purged from the AUL Registry. (Preferably, the value to use for this expiration timer and the value to use for the timeout period described above with reference to Block 755 are determined by consulting a configuration file or other similarly-stored information, using techniques which are known in the art.)

In an optional aspect of the present invention, the Core server enables provision of location-based security features for a short-range wireless network. As previously stated, all network traffic generated by client devices is tunneled between the HMP in use by the client and the Core server. The Core may then filter this traffic, as required by the needs of a particular implementation. For example, the Core may filter out traffic destined to selected application servers and/or application programs based on a number of factors including the identity and/or location of the user (or user's client device) who is generating the traffic. In the preferred embodiment, this filtering is handled through use of a policy file that is associated with the Core. Traffic that arrives at the Core destined for a client device may be similarly filtered, using the same or a different policy file. Information in the policy file(s) is preferably created by a systems administrator (using, for example, a simple text editor). Alternatively, entries may be created in other ways (including programmatic generation of policy information), using techniques that do not form part of the present invention.

FIG. 9 provides an example 900 of a policy file that may be used with the present invention. As shown in this example at 910, traffic destined for a resource identified as "Bob's thermostat" 915 is only allowed from the user named "Bob" 920 while this user is at the location identified as "Bob's Office" 925. In other words, Bob can change his thermostat while he is standing in his office but nowhere else, but all other changes will be filtered out (i. e. denied) by the Core before they can reach an application program that would change the thermostat setting. This first example entry 910 illustrates use of a restrictive policy that explicitly identifies conditions that allow traffic to be forwarded. As an alternative, a permissive policy may be specified, as shown in the entry at 930. This policy entry 930 explicitly specifies conditions that prevent traffic from being forwarded, and all other traffic will therefore be allowed. In this case, traffic that originates from the user identified as "Rich" 940 or from the location identified as "Lobby" 950 will be filtered out (denied) from reaching the resource identified as "Bob's printer" 935, while all other traffic will be allowed.

The syntax used in FIG. 9 is for purposes of illustration, and not of limitation. When this location-based security feature of the present invention is used, the Core server may be adapted to processing policy entries specified in any similar notation. This policy information may be stored in a number of ways, including as a flat file, database entry, directory entry, etc. As will be obvious, the resources that are to be protected through use of policy information may vary widely from one implementation to another, and the conditional logic used to specify the filtering conditions may use one or more conditions such as those depicted in FIG. 9.

In another optional aspect of the present invention, application programming interfaces (APIs) are exposed to allow applications running on application servers to query the Core's HMP Registry, AUL Registry, log files, and/or configuration files (including policy files such as those which have been described). (The manner in which remote APIs are created, and in which they operate, are well known in the art and will not be described in detail herein.) Through these APIs, an application can perform a number of useful functions such as: querying which HMPs are currently active; determining identifying information about an HMP (including where the HMP is located, if that information is stored in the HMP Registry); determining whether an HMP currently accessing the application will soon be due for refreshing its registration; identifying the set of currently-active users, as well as the HMP to which those users are currently connected; etc.

An application may use information gleaned through the HMP Registry, AUL Registry, log files, and/or policy file(s) to provide personalized and location-based services on behalf of users. Because the wireless communication environment in which the present invention is preferably used is short-range, the location information is rather fine-grained (being limited to 10 meters in the Bluetooth environment, for example), and thus micro-location based services can be built. Examples of such location-based services include: "print to the nearest printer"; "remind this user to take the garbage out when the user is near the front door"; "manipulate the local room lights" (or perhaps the local appliances or temperature); etc.

The environment in which the present invention operates may be extended by using a plurality of Core servers, each managing a number of HMPs. In this case, a Core Management Server is operatively coupled to the plurality of Core servers. This Core Management Server provides services on behalf of the Core servers, including one or more-of: monitoring services; remote diagnostics services; remote configuration services; or other management services. These services are preferably provided by APIs such as those which have been described, enabling the Core Management Server to access information maintained at each Core server. In this manner, an administrator or service provider can simply and flexibly support and maintain a set of remote Core servers.

The Core Management Server (not shown in the environment of FIG. 1) may be implemented as a stand-alone function separate from other Core servers, or it may be integrated within a device that also operates as a Core server. Furthermore, each Core server in an environment may include functionality allowing it to operate as a Core Management Server, if desired, such that location of the management functions can change dynamically from one device to another. Preferably, the Core Management Server operates in a passive mode, whereby it is always active but its services are invoked only when needed (e.g. when it is desirable to manage a particular Core, to enable a user to move from a home network managed by a first Core to a different network managed by another Core, etc.).

Moreover, a Core server may make requests using APIs that are exposed by the Core Management Server. Example functions for which APIs may be provided at the Core Management Server include: determining the location or address of another Core; establishing communications with another Core; or performing other types of services.

As has been demonstrated, the present invention provides a number of advantages over prior art short-range wireless networking solutions. With the present invention, no modification to the operating system, the networking software, nor the applications on a client device is required in order to provide users with seamless mobility. HMPs automatically configure and register themselves, without system administrator intervention. Failures of HMPs, and of client devices, are automatically detected and handled. Handoff of client devices as they roam from one HMP to another is handled transparently to the client device. No LAN-specific servers need to be established or installed by a systems administrator, thereby greatly reducing the administrative burden and expense as compared to prior art solutions. Inter-connected domains may be provided, with Core servers for each domain managed by a Core Management Server.

The foregoing description of a preferred embodiment is for purposes of illustrating the present invention, and is not to be construed as limiting thereof. Although a preferred embodiment has been described, it will be obvious to those of skill in the art that many modifications to this preferred embodiment are possible without materially deviating from the novel teachings and advantages of this invention as disclosed herein. Accordingly, all such modifications are intended to be within the scope of the present invention, which is limited only by the claims hereafter presented (and their equivalents).

That which is claimed is:

1. A method of enabling seamless user mobility in a short-range wireless networking, environment, comprising the steps of:

providing one or more portable client devices, each of the client devices equipped with a short-range wireless communications capability for communicating in the short-range wireless networking environment;

providing a plurality of Handoff Management Points (HMPs), each of the HMPs equipped with a short-range wireless link for communication with the client devices and a link to a networking environment wherein one or more application programs residing on one or more application server can be accessed;

providing a Handoff Core Server to manage the HMPs;

dynamically making a selected one of the HMPs operational, further comprising the steps of:

obtaining an Internet Protocol (IP) address for the selected HMP;

discovery by the selected HMP, an identity of the Handoff Core Server; and initiating, by the selected HMP, an HMP presence protocol exchange with the Handoff Core Server, further comprising the step of sending a registration request to the Handoff Core Server to register the selected HMP with the Handoff Core Server;

obtaining a registration response from the Handoff Core Server; and if the registration response is successful, periodically refreshing the selected HMP's registration with the Handoff Core Server.

2. A method of enabling seamless user mobility in a short-range wireless networking environment comprising the steps of:

providing one or more portable client devices, each of the client devices equipped with a short-range wireless communications capability for communicating in the short-range wireless networking environment;

providing a plurality of Handoff Management Points (HMPs), each of the HMPs equipped with a short-range wireless link for communication with the client devices and a link to a networking environment wherein one or more application programs residing on one or more application servers can be accessed;

providing a Handoff Core Server to the manage the HMPs, wherein the Handoff Core Server maintains a record of a current location of each client device;

receiving at least one of (1) traffic generated by a particular client device and (2) traffic destined for a particular client device at the Handoff Core Server; and filtering the received traffic, by the Handoff Core Server, according to one or more of: (1) a destination of the traffic (2) a current location of the particular client device; and (3) an identity of a user of the particular client device.

3. A method of enabling seamless user mobility in a short-range wireless networking environment comprising the steps of:

providing one or more portable client device each of the client devices equipped with a short-range wireless communications capability for communicating in the short-range wireless networking environment;

providing a plurality of Handoff Management Points (HMPs), each of the HMPs equipped with a short-range wireless link for communication with the client devices and a link to a networking environment wherein one or more application programs residing on one or more application servers can be accessed;

providing a Handoff Core Server to manage the HMPs;

detecting, by a particular HMP, an establishment of a new communication channel with a selected client device;

issuing a channel establishment notification to the Handoff Core Server, responsive to the detecting step; and updating, by the Handoff Core Server, an Active User Location (AUL) Registry, responsive to receiving the channel establishment notification.

4. The method according to claim 3, wherein the establishment is an explicit establishment.

5. The method according to claim 3, wherein the establishment is an implicit establishment.

6. The method according to claim 3, further comprising the steps of:

detecting, by the particular HMP, a termination of an existing communication channel with a particular client device;

issuing a channel termination notification to the Handoff Core Server, responsive to the step of detecting the termination; and updating, by the Handoff Core Server, the AUL Registry, responsive to receiving the channel termination notification.

7. The method according to claim 6, wherein the termination is an explicit termination.

8. The method according to claim 6, wherein the termination is an implicit termination.

9. A system for enabling seamless user mobility in a wireless networking environment, comprising:

one or more portable user devices, each equipped with a short-range wireless communications capability for communicating in the wireless networking environment;

one or more application programs residing on one or more application servers;

a plurality of Handoff Management Points (HMPs), each equipped with a wireless link for communication with the user devices and a link to a networking environment wherein the application programs and application servers reside;

a Handoff Core Server (HCS) to manage the HMPs;

means for dynamically registering each HMP with the HCS as the HMP becomes operational, wherein an installation and configuration of the operational HMP requires no incremental intervention by a human;

means for making a selected user device known to a first HMP when the selected user device comes into communication range with the first HMP;

means for handing the selected user device off from the fix HMP to a second HMP when the selected user device leaves the communication range of the first HMP and enters communication range of the second HMP; and means for maintaining, during and after the handing off, any on-going session that may be operating between the selected user device and one or more of the application programs.

10. The system according to claim 9, wherein the means for maintaining further comprises:

means for assigning an Internet Protocol (IP) address to the selected user device when the selected user device is in the communication range of the first HMP; and means for continuing to use the IP address for the selected user device when the selected user device is in the communication range of the second HMP.

11. The system according to claim 10, wherein the means for assigning further comprises means for storing the IP address for the selected user device at the HCS, and wherein the means for continuing to use further comprises means for retrieving the stored IP address from the HCS.

12. The system according to claim 9, further comprising means for re-registering each dynamically registered HMP after expiration of a particular period of time.

13. Computer program instructions embodied on one or more computer readable media, the computer program instructions being adapted for causing a computer system to generate executable code for a computer program, the computer program enabling seamless user mobility in a wireless networking environment, the computer program instructions comprising:

computer program instructions for dynamically registering a plurality of Handoff Management Points (HMPs) with a Handoff Core Server (HCS) as the HMP becomes operational, wherein each HMP is equipped with a wireless link for communication with a plurality of user devices and a link to a networking environment wherein a plurality of application programs and application servers reside, wherein each of the user devices being is equipped with a short-range wireless communications capability for communicating in the wireless networking environment, and wherein an installation and configuration of the operational HMP requires no incremental intervention by a human;

computer program instructions for causing thee HCS to manage the HMPs;

computer program instructions for making a selected user device known to a first HMP when the selected user device comes into communication range with the first HMP;

computer program instructions for handing the selected user device off from the first HMP to a second HMP when the selected user device leaves the communication range of the first HMP and enters communication range of the second HMP; and computer program instructions for maintaining, during and after the handing off, any on-going session that may be operating between the selected user device and one or more of the application programs.

14. The computer program instructions according to claim 13, wherein the computer program instructions for maintaining further comprise:

computer program instructions for assigning an Internet Protocol (IP) address to the selected user device when the selected user device is in the communication range of the first HMP; and computer program instructions for continuing to use the IP address for the selected user device when the selected user device is in the communication range of the second HMP.

15. The computer program instructions according to claim 14, wherein the computer program instructions for assigning further comprises computer program instructions for storing the IP address for the selected user device at the HCS, and wherein the computer program instructions for continuing to use further comprises computer program instructions for retrieving the stored IP address from the HCS.

16. The computer program instructions according to claim 13, further comprising computer program instructions for re-registering each dynamically registered HMP after expiration of a particular period of time.

17. A system for enabling seamless user mobility in a short-range wireless networking environment, comprising:

one or more portable client devices, each of the client devices equipped with a short-range wireless communications capability for communicating in the short-range wireless networking environment;

a plurality of Handoff Management Points (HMPs), each of the HMPs equipped with a short-range wireless link for communication with the client devices and a link to a networking environment wherein one or more application programs residing on one or more application servers can be accessed;

Handoff Core Server to manage the HMPs;

means for dynamically making a selected one of the HMPs operational, further comprising:

means for obtaining an Internet Protocol (IP) address for the selected HMP;

means for discovering, by the selected HMP, an identity of the Handoff Core Server; and means for initiating, by the selected HMP, an HMP presence protocol exchange with the Handoff Core Server, further comprising means for sending a registration request to the Handoff Core Server to register the selected HMP with the Handoff Core Server;

means for obtaining a registration response from the Handoff Core Server; and means for periodically refreshing the selected HMP's registration with the Handoff Core Server if the registration response is successful.

18. A system for enabling seamless user mobility in a short-range wireless networking environment, comprising:

one or more portable client devices, each of the client devices equipped with a short-range wireless communications capability for communicating in the short-rage wireless networking environment;

a plurality of Handoff Management Points (HMPs), each of the HMPs equipped with a short-range wireless link for communication with the client devices and a link to a networking environment wherein one or more application programs residing on one or more application servers can be accessed;

a Handoff Core Server to manage the HMPs, wherein the Handoff Core Server maintains a record of a current location of each client device;

means for receiving at least one of (1) traffic generated by a particular client device and (2) traffic destined for a particular client device at the Handoff Core Server; and means for filtering the received traffic, by the Handoff Core Server, according to one or more of: (1) a destination of the traffic; (2) a current location of the particular client device; and (3) an identity of a user of the particular client device.

19. A system for enabling seamless user mobility in a short-range wireless networking environment, comprising:

one or more portable client devices, each of the client devices equipped with a short-range wireless communications capability for communicating in the short-range wireless networking environment;

a plurality of Handoff Management Points (HMPs), each of the HMPs equipped with a short-range wireless link for communication with the client devices and a link to a networking environment wherein one or more application programs residing on one or more application servers can be accessed;

a Handoff Core Server to manage the HMPs;

means for detecting, by a particular HMP, an establishment of a new communication channel with a selected client device;

means for issuing a channel establishment notification to the Handoff Core Server, responsive to the means for detecting; and means for updating, by the Handoff Core Server, an Active User Location (AUL) Registry, responsive to receiving the channel establishment notification.

20. The system according to claim 19, wherein the establishment is an explicit establishment.

21. The system according to claim 19, wherein the establishment is an implicit establishment.

22. The system according to claim 19, further comprising:
means for detecting, by the particular HMP, a termination of an existing communication channel with a particular client device;
means for issuing a channel termination notification to the Handoff Core Server, responsive to the means for detecting the termination; and
means for updating, by the Handoff Core Server, the AUL Registry, responsive to receiving the channel termination notification.

23. The system according to claim 22, wherein the termination is an explicit termination.

24. The system according to claim 22, wherein the termination is an implicit termination.

25. Computer program instructions embodied on one or more computer readable media, the computer program instructions being adapted for causing a computer system to execute a computer program, the computer program enabling seamless user mobility in a short-range wireless networking environment, the computer program instructions comprising:
computer program instructions for dynamically making a selected one of a plurality of Handoff Management Points (HMPs) operational, wherein each of the HMPs is equipped with a short-range wireless link for communication wit one or more portable client devices and a link to a networking environment wherein one or more application programs residing on one or more application servers can be accessed, each of the client devices equipped with a short-range wireless communications capability for communicating in the short-range wireless networking environment, and wherein the computer program instructions for dynamically making further comprises:
computer program instructions for obtaining an Internment Protocol (IP) address for the selected HMP;
computer program instructions for discovering, by the selected HMP, an identity of a Handoff Core Server that manages the HMPs; and
computer program instructions for initiating, by the selected HMP, an HMP presence protocol exchange with the Handoff Core Server, further comprising computer program instructions for sending a registration request to the Handoff Core Server to register the selected HMP with the Handoff Core Server;
computer program instructions for obtaining a registration response from the Handoff Core Server; and
computer program instructions for periodically refreshing the selected HMP's registration with the Handoff Core Server if the registration response is successful.

26. Computer program instructions embodied on one or more computer readable media, the computer program instructions being adapted for causing a computer system to execute a computer program, the computer program enabling seamless user mobility in a short-range wireless networking environment, the computer program instructions comprising:
computer program instructions for managing, by a Handoff Core Server that maintains a record of a current location of each of one or more client devices, a plurality of Handoff Management Points (HMPs), wherein each of the HMPs is equipped with a short-range wireless link for communication with the client devices and a link to a networking environment wherein one or more application programs residing on one or more application servers can be accessed, each of the client devices equipped with a short-range wireless communications capability for communicating in the short-range wireless networking environment;
computer program instructions for receiving at least one of (1) traffic generated by a particular client device and (2) traffic destined for a particular client device at the Handoff Core Server; and
computer program instructions for filtering he received traffic, by the Handoff Core Server, according to one or more of: (1) a destination of the traffic; (2) a current location of the particular client device; and (3) an identity of a use of the particular client device.

27. Computer program instructions embodied on one or more computer readable media, the computer program instructions being adapted for causing a computer system to execute a computer program, the computer program enabling seamless user mobility in a short-range wireless networking environment, the computer program instructions comprising:
computer program instructions for detecting, by a particular one of a plurality of Handoff Management Points (HMPs), an establishment of a new communication channel with a selected one of one or more client devices, each of the client devices equipped with a short-range wireless communications capability for communicating in the short-range wireless networking environment and each of the HMPs equipped with a short-range wireless link for communication with the client devices and a link to a networking environment wherein one or more application programs residing on one or more application servers can be accessed;
computer program instructions for issuing a channel establishment notification to a Handoff Core Server that manages the HMPs, responsive to the computer program instructions for detecting; and
computer program instructions for updating, by the Handoff Core Server, an Active User Location (AUL) Registry, responsive to receiving the channel establishment notification.

28. The computer program instructions according to claim 27, wherein the establishment is an explicit establishment.

29. The computer program instructions according to claim 27, wherein the establishment is an implicit establishment.

30. The computer program instructions according to claim 27, further comprising:
computer program instructions for detecting, by the particular HMP, a termination of an existing communication channel with a particular client device,
computer program instructions for issuing a channel termination notification to the Handoff Core Server, responsive to the computer program instructions for detecting the termination; and
computers instructions for updating, by the Handoff Core Sever, the AUL Registry, responsive to receiving the channel termination notification.

31. The computer program instructions according to claim 30, wherein the termination is an explicit termination.

32. The computer program instructions according to claim 30, wherein the termination is an implicit termination.

33. A method for enabling seamless user mobility in a wireless networking environment, comprising steps of:
providing a plurality of Handoff Management Points (HMPs), each equipped with a wireless link for communication with one or more portable user devices and a link to a networking environment wherein one or more application programs and one or more application servers reside, wherein each of the user devices is equipped with a short-range wireless communications capability for communicating in the wireless networking environment and wherein the one or more application programs reside on the one or more application serves;

providing a Handoff Core Server (HCS) to manage the HMPs;

dynamically registering each HMP with the HCS as the HMP becomes operational, wherein an installation and configuration of the operational HMP requires no incremental intervention by a human;

making a selected user device known to a first HMP when the selected user device comes into communication range with the first HMP;

handing the selected user device off from the fast HMP to a second HMP when the selected user device leaves the communication range of the first HMP and enters communication range of the second HMP; and maintaining, during and after the handing off, any on-going session that may be operating between the selected user device and one or more of the application programs.

34. The method according to claim 33, wherein the maintaining step further comprises the steps of:

assigning an Internet Protocol (EP) address to the selected user device when the selected user device is in the communication range of the first HMP; and continuing to use the IP address for the selected user device when the selected use device is in the communication range of the second HMP.

35. The method according to claim 34, wherein the assigning step further comprises the step of storing the IP address for the selected user device at the HCS, and the step of continuing to use further comprises the step of retrieving the stored IP address from the HCS.

36. The method according to claim 33, further comprising the step of re-registering each dynamically registered HMP after expiration of a particular period of time.

* * * * *

UNITED STATES PATENT AND TRADEMARK OFFICE
CERTIFICATE OF CORRECTION

PATENT NO. : 6,633,761 B1
DATED : October 14, 2003
INVENTOR(S) : Singhal et al.

It is certified that error appears in the above-identified patent and that said Letters Patent is hereby corrected as shown below:

Column 3,
Line 54, change "depicted" to read -- depicted. --.

Column 9,
Linr 15, change "802.11." to read -- 802.11, --;
Line 15, change "request." to read -- request.) --.

Column 14,
Line 62, change "networking," to read -- networking --.

Column 15,
Line 12, change "discovery" to read -- discovering --;
Lines 25 and 49, change "environment" to read -- environment, --;
Line 45, change "traffic" to read -- traffic; --;
Line 51, change "device" to read -- devices, --.

Column 16,
Line 44, change "fix" to read -- first --.

Column 17,
Line 16, delete "being";
Line 21, change "thee" to read -- the --.

Column 18,
Line 4, change "Handoff" to read -- a Handoff --.

Column 19,
Line 30, change "wit" to read -- with --;
Line 39-40, change "interment" to read -- internet --.

Column 20,
Line 12, change "he" to read -- the --;
Line 16, change "use" to read -- user --;
Line 57, change "computers" to read -- computer program --.

Column 21,
Line 19, change "fast" to read -- first --.

UNITED STATES PATENT AND TRADEMARK OFFICE
CERTIFICATE OF CORRECTION

PATENT NO. : 6,633,761 B1
DATED : October 14, 2003
INVENTOR(S) : Singhal et al.

It is certified that error appears in the above-identified patent and that said Letters Patent is hereby corrected as shown below:

<u>Column 22,</u>
Line 7, change "(EP)" to read -- (IP) --;
Line 15, change "and" to read -- and wherein --.

Signed and Sealed this

Fourth Day of January, 2005

JON W. DUDAS
*Director of the United States Patent and Trademark Office*